United States Patent

Musk

[11] Patent Number: 6,006,864
[45] Date of Patent: Dec. 28, 1999

[54] TREE LADDER ATTACHMENT

[76] Inventor: Frank Walter Musk, 2107 Evanston, Muskegon, Mich. 49442

[21] Appl. No.: 09/190,571

[22] Filed: Nov. 12, 1998

[51] Int. Cl.[6] ...................................................... E04G 3/00
[52] U.S. Cl. ........................................... 182/187; 182/197
[58] Field of Search .................................... 182/197, 187, 182/196, 206

[56] References Cited

U.S. PATENT DOCUMENTS

| | | | |
|---|---|---|---|
| 3,817,350 | 6/1974 | Gray | 182/187 |
| 4,139,080 | 2/1979 | Wells | 182/187 |
| 4,579,198 | 4/1986 | Lee | 182/187 X |
| 5,564,524 | 10/1996 | Thaggard et al. | 182/187 X |

*Primary Examiner*—Daniel P. Stodola
*Assistant Examiner*—Hugh B. Thompson

[57] ABSTRACT

A tree ladder attachment for attachment to a tree to permit a user to climb up the tree. The tree ladder attachment includes a vertical bar with a horizontal bar coupled to a lower end of the vertical bar. The ends of an elongate flexible member are coupled to an upper end of the vertical bar. The flexible member forms a loop for wrapping around a tree trunk to hold the vertical bar to the tree trunk. A cross bar is connected to the horizontal bar by a pair of extension bars. A ladder comprising a spaced apart pair of elongate flexible rails and a plurality of spaced apart rungs is depended from the cross bar.

7 Claims, 3 Drawing Sheets

TREE LADDER ATTACHMENT

BACKGROUND OF THE INVENTION

1. Field of the Invention

The present invention relates to rope ladder attachments and more particularly pertains to a new tree ladder attachment for attachment to a tree to permit a user to climb up the tree.

2. Description of the Prior Art

The use of rope ladder attachments is known in the prior art. More specifically, rope ladder attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,554,996; U.S. Pat. No. 4,442,920; U.S. Pat. No. 1,910,546; U.S. Pat. No. Des. 298,700; U.S. Pat. No. 3,128,843; and U.S. Pat. No. 4,867,275.

While these devices fulfill their respective, particular objectives and requirements, the aforementioned patents do not disclose a new tree ladder attachment. The inventive device includes a vertical bar with a horizontal bar coupled to a lower end of the vertical bar. The ends of an elongate flexible member are coupled to an upper end of the vertical bar. The flexible member forms a loop for wrapping around a tree trunk to hold the vertical bar to the tree trunk. A cross bar is connected to the horizontal bar by a pair of extension bars. A ladder comprising a spaced apart pair of elongate flexible rails and a plurality of spaced apart rungs is depended from the cross bar.

In these respects, the tree ladder attachment according to the present invention substantially departs from the conventional concepts and designs of the prior art, and in so doing provides an apparatus primarily developed for the purpose of attachment to a tree to permit a user to climb up the tree.

SUMMARY OF THE INVENTION

In view of the foregoing disadvantages inherent in the known types of rope ladder attachments now present in the prior art, the present invention provides a new tree ladder attachment construction wherein the same can be utilized for attachment to a tree to permit a user to climb up the tree.

The general purpose of the present invention, which will be described subsequently in greater detail, is to provide a new tree ladder attachment apparatus and method which has many of the advantages of the rope ladder attachments mentioned heretofore and many novel features that result in a new tree ladder attachment which is not anticipated, rendered obvious, suggested, or even implied by any of the prior art rope ladder attachments, either alone or in any combination thereof.

To attain this, the present invention generally comprises a vertical bar with a horizontal bar coupled to a lower end of the vertical bar. The ends of an elongate flexible member are coupled to an upper end of the vertical bar. The flexible member forms a loop for wrapping around a tree trunk to hold the vertical bar to the tree trunk. A cross bar is connected to the horizontal bar by a pair of extension bars. A ladder comprising a spaced apart pair of elongate flexible rails and a plurality of spaced apart rungs is depended from the cross bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new tree ladder attachment apparatus and method which has many of the advantages of the rope ladder attachments mentioned heretofore and many novel features that result in a new tree ladder attachment which is not anticipated, rendered obvious, suggested, or even implied by any of the prior art rope ladder attachments, either alone or in any combination thereof.

It is another object of the present invention to provide a new tree ladder attachment which may be easily and efficiently manufactured and marketed.

It is a further object of the present invention to provide a new tree ladder attachment which is of a durable and reliable construction.

An even further object of the present invention is to provide a new tree ladder attachment which is susceptible of a low cost of manufacture with regard to both materials and labor, and which accordingly is then susceptible of low prices of sale to the consuming public, thereby making such tree ladder attachment economically available to the buying public.

Still yet another object of the present invention is to provide a new tree ladder attachment which provides in the apparatuses and methods of the prior art some of the advantages thereof, while simultaneously overcoming some of the disadvantages normally associated therewith.

Still another object of the present invention is to provide a new tree ladder attachment for attachment to a tree to permit a user to climb up the tree.

Yet another object of the present invention is to provide a new tree ladder attachment which includes a vertical bar with a horizontal bar coupled to a lower end of the vertical bar. The ends of an elongate flexible member are coupled to an upper end of the vertical bar. The flexible member forms a loop for wrapping around a tree trunk to hold the vertical bar to the tree trunk. A cross bar is connected to the horizontal bar by a pair of extension bars. A ladder comprising a spaced apart pair of elongate flexible rails and a plurality of spaced apart rungs is depended from the cross bar.

Still yet another object of the present invention is to provide a new tree ladder attachment that lets hunters quickly and easily climb a tree.

Even still another object of the present invention is to provide a new tree ladder attachment that is compact and collapsible to make it easier to carry and transport when traversing rugged terrain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
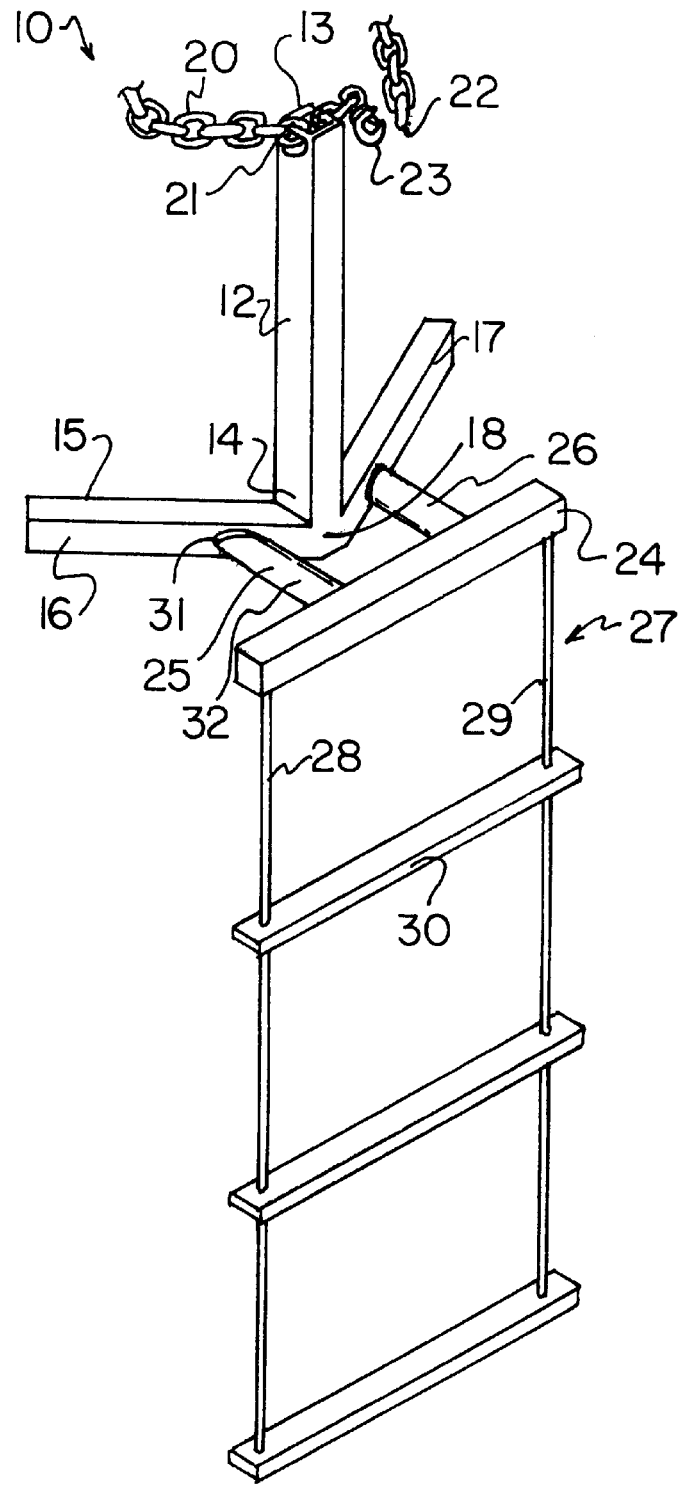
FIG. 1 is a schematic perspective view of a new tree ladder attachment according to the present invention.

With reference now to the drawings, and in particular to FIGS. 1 through 5 thereof, a new tree ladder attachment embodying the principles and concepts of the present invention and generally designated by the reference numeral 10 will be described.

As best illustrated in FIGS. 1 through 5, the tree ladder attachment 10 generally comprises a vertical bar 12 with a horizontal bar 15 coupled to a lower end 14 of the vertical bar 12. The ends 21,22 of an elongate flexible member 20 are coupled to an upper end 13 of the vertical bar 12. The flexible member 20 forms a loop for wrapping around a tree trunk 11 to hold the vertical bar 12 to the tree trunk 11. A cross bar 24 is connected to the horizontal bar 15 by a pair of extension bars 25,26. A ladder 27 comprising a spaced apart pair of elongate flexible rails 28,29 and a plurality of spaced apart rungs 30 is depended from the cross bar 24.

In use, the ladder attachment 10 designed for climbing a trunk of a tree or a similar structure. Specifically, the elongate vertical bar 12 has opposite upper and lower ends 13,14 and a longitudinal axis extending between the upper and lower ends 13,14 of the vertical bar 12. Preferably, the vertical bar 12 is tubular for reducing the weight of the vertical bar 12 for making it easier to carry and has openings therein at the upper and lower ends 13,14 of the vertical bar 12 to let any water or precipitation falling into the vertical bar 12 to quickly and easily drain out of the vertical bar 12. The vertical bar 12 also preferably has a generally rectangular transverse cross section generally perpendicular to the longitudinal axis of the vertical bar 12.

The horizontal bar 15 is coupled to the lower end 14 of the vertical bar 12. The horizontal bar 15 has a pair of opposite ends and a midpoint located between the ends of the horizontal bar 15. Preferably, the midpoint of the horizontal bar 15 is about equidistant from each of the ends of the horizontal bar 15. The lower end 14 of the vertical bar 12 is preferably positioned at the midpoint of the horizontal bar 15. Like the vertical bar, the horizontal bar 15 is preferably tubular for reducing the weight of the horizontal bar 15 for making it easier to carry and has openings therein at the ends of the horizontal bar 15 to let any water or precipitation entering the horizontal bar 15 to quickly and easily drain out of the horizontal bar 15.

The midpoint of the horizontal bar 15 divides the horizontal bar 15 into a pair of arm portions 16,17. Each of the arm portions 16,17 of the horizontal bar 15 has a longitudinal axis extending between the midpoint of the horizontal bar 15 and an adjacent end of the horizontal bar 15. Each of the arm portions 16,17 of the horizontal bar t5 preferably has a generally rectangular transverse cross section generally perpendicular to the longitudinal axis of the respective arm portion 16,17. The longitudinal axes of the arm portions 16,17 generally lie in a common plane with the longitudinal axis of the vertical bar 12 extending generally perpendicular to the common plane of the longitudinal axes of the arm portions 16,17.

Figure 3:
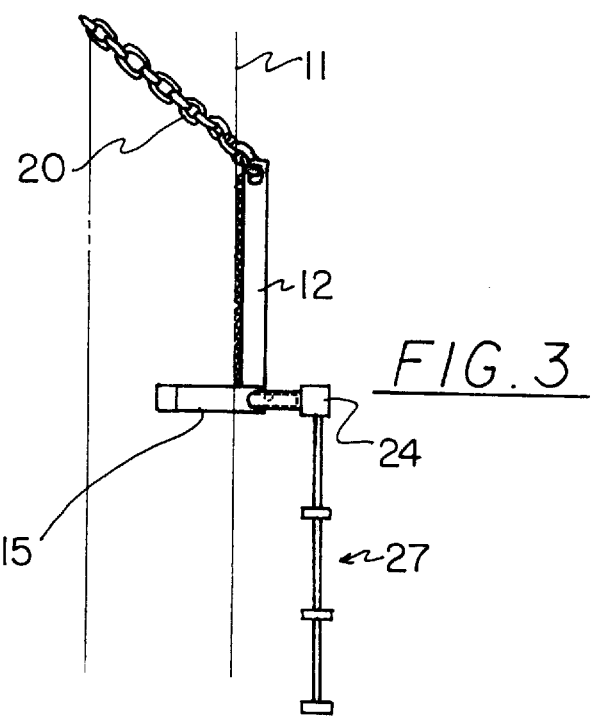
FIG. 3 is a schematic side view of the present invention in use on a tree trunk.
Figure 4:
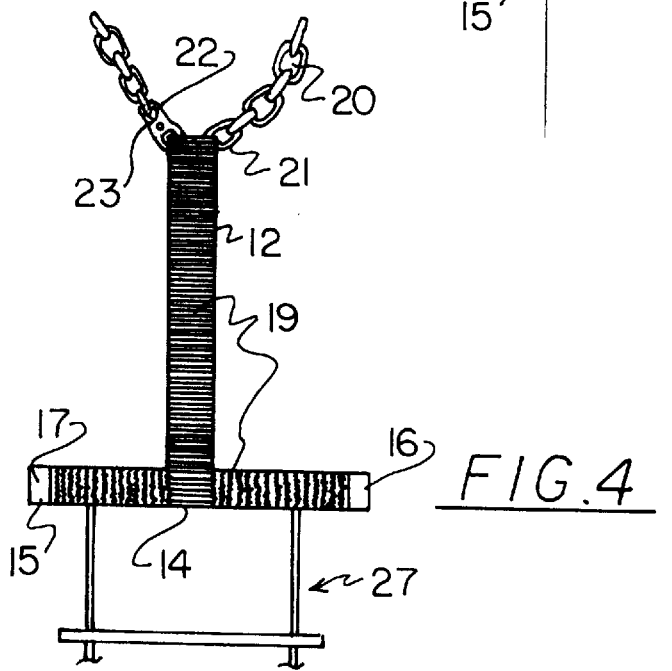
FIG. 4 is a schematic back view of the present invention.
Figure 5:
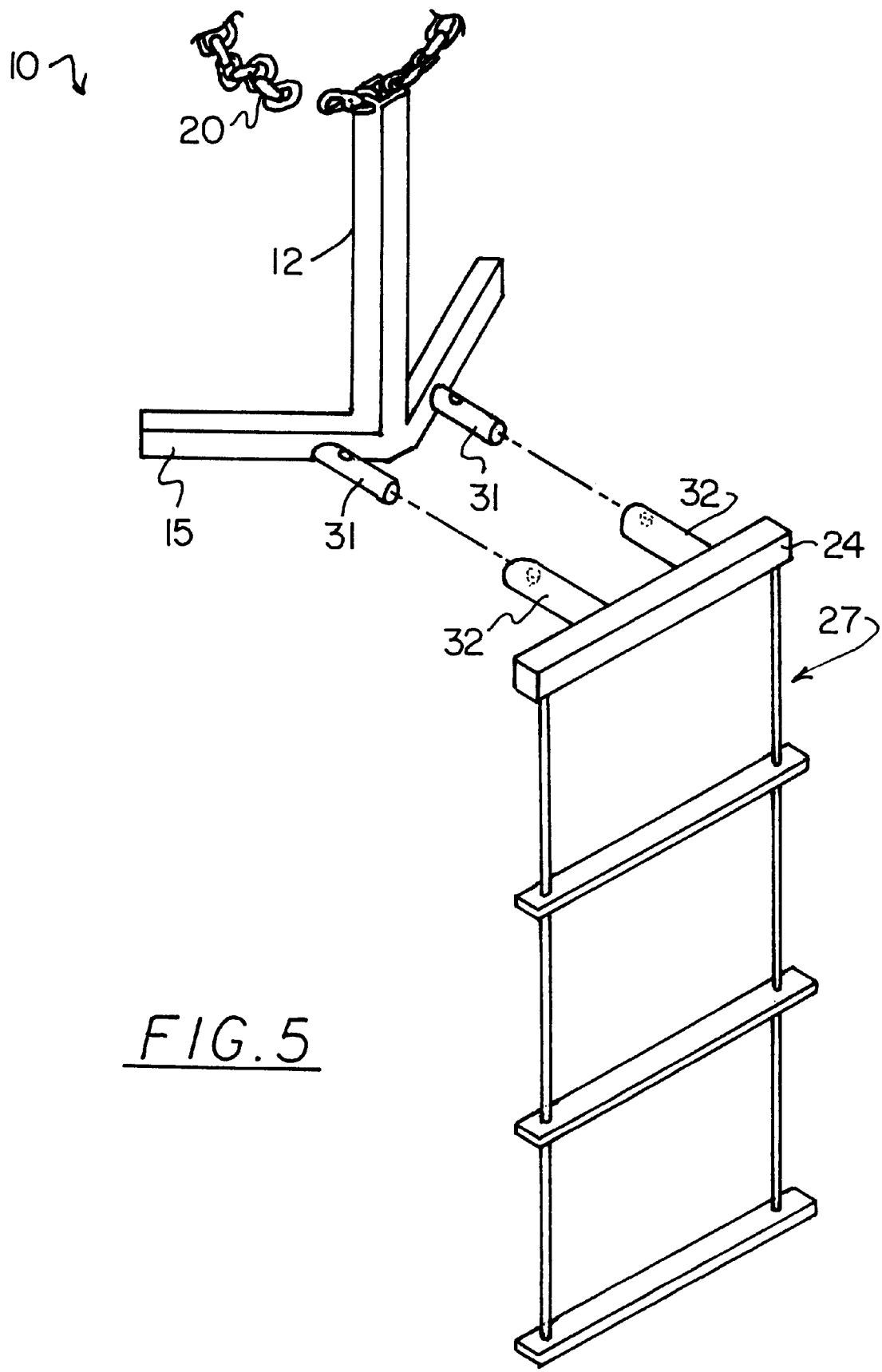
FIG. 5 is a schematic exploded view of the present invention illustrating the detachable portions of the extension bars.

In use, the vertical bar 12 and the arm portions 16,17 of the horizontal bar 15 are designed for abutting against a tree trunk 11 as illustrated in FIG. 3 such that the longitudinal axis of the vertical bar 12 is extended generally vertically and the longitudinal axes of the arm portions 16,17 are extended generally horizontally.

Preferably, the longitudinal axes of the arm portions 16,17 are extended at an obtuse angle from one another to define a generally V-shaped spaced designed for receiving a tree trunk 11 abutting the arm portions 16,17. The arm portions 16,17 form a vertex 18 at the midpoint of the horizontal bar 15 designed for extending outwardly away from the tree trunk 11 the arm portions 16,17 rest against. The vertical bar 12 and the arm portions 16,17 of the horizontal bar 15 each have a back face designed for contacting the tree trunk 11 the vertical bar 12 and the arm portions 16,17 abut against. The back faces of the vertical bar 12 and the arm portions 16,17 each preferably have a plurality of cleat ridges 19 for gripping the tree trunk 11 for frictionally enhancing the contact between the back faces and the tree trunk 11 to help hold the vertical bar 12 and the arm portions 16,17 in a fixed position with respect to the tree trunk 11.

Figure 2:
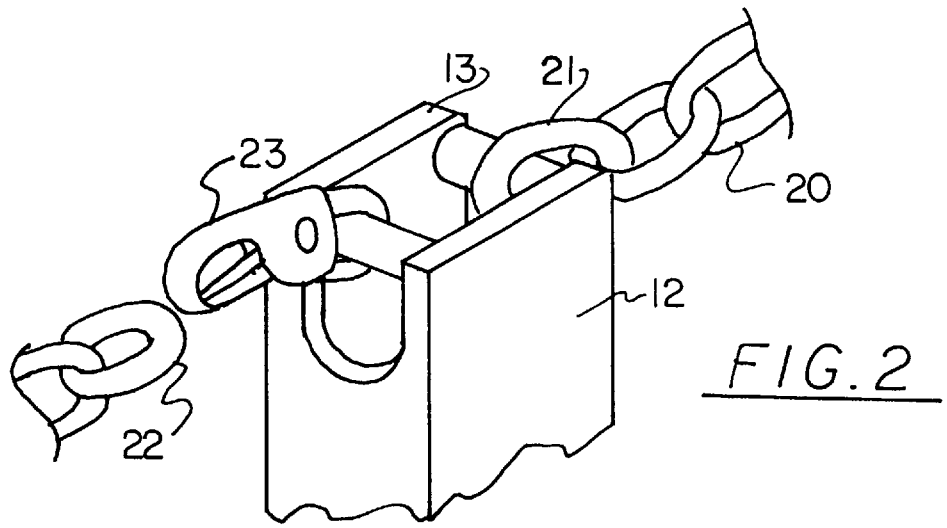
FIG. 2 is a schematic partial perspective view of the upper end of the vertical member of the present invention.

The elongate flexible member 20 has a pair of opposite ends 21,22. Preferably as illustrated in the figures, the flexible member 20 comprises a length of chain. As illustrated in FIG. 2, a first of the ends 21 of the flexible member 20 is fixedly coupled to the upper end 13 of the vertical member preferably by extending a rod coupled to the upper end 13 of the vertical bar 12 through a link of the chain. A second of the ends 22 of the flexible member 20 is detachably attached to the upper end 13 of the vertical bar 12. In use, the flexible member 20 forms a loop designed for wrapping around a tree trunk 11 to hold or hang the vertical bar 12 to the tree trunk 11 as shown in FIG. 3. Ideally, the upper end 13 of the vertical bar 12 has a spring clip 23 pivotally coupled thereto by a rod extended across the opening of the upper end 13 of the vertical bar 12. The spring clip 23 detachably attaches the second end 22 of the flexible member 20 to the upper end 13 of the vertical member. In use, the spring clip 23 permits attachment to a middle link of the flexible member 20 to reduce the effective diameter of the loop formed by the flexible member 20 to fit various diameters of tree trunks 11.

The cross bar 24 has a pair of opposite ends and a longitudinal axis extending between the ends of the cross bar 24. The cross bar 24 is preferably tubular for reducing the weight of the cross bar 24 for making it easier to carry and has openings therein at the ends of the cross bar 24 to let any water or precipitation entering the cross bar 24 to quickly and easily drain out of the cross bar 24. The cross bar 24 is spaced apart from the vertex 18 of the horizontal bar 15 with a spaced apart pair of extension bars 25,26 connecting the cross bar 24 and the horizontal bar 15 together. One of the extension bars 25 is outwardly extended from one of the arm portions 16 of the horizontal bar 15 and another of the extension bars 26 is outwardly extended from another of the arm portions 17 of the horizontal bar 15. The extension bars 25,26 are preferably extended generally parallel to one another and generally perpendicular to the longitudinal axis of the cross bar 24. The extension bar 25,26, the horizontal bar 15 and the cross bar 24 preferably generally lie in a common horizontal plane.

The rope ladder 27 comprises a spaced apart pair of elongate flexible rails 28,29 and a plurality of spaced apart rigid rungs 30 extending between the flexible rails 28,29. Ideally, the flexible rails 28,29 each comprise a flexible rope. Each of the flexible rails 28,29 has a top end coupled to the cross bar 24 such that the ladder 27 depends from the cross bar 24. The top end of one of the flexible rails is positioned adjacent one of the ends of the cross bar and the top end of another of the flexible rails is positioned adjacent another of the ends of the cross bar. In use, the ladder 27 is designed for permitting a user to climb up the tree trunk 11.

Ideally, each of the extension bars 25,26 comprises a pair of detachable portions 31,32 (such as male and female detachably attachable portions). One of the detachable portions 31 of each of the extension bars 25,26 is coupled to the horizontal bar 15. Another of the detachable portions 32 of each of the extension bars 25,26 is coupled to the cross bar 24. The detachable portions 31,32 are designed for permitting separation of the cross bar 24 from the horizontal bar 15 for permitting compacting of the ladder attachment 10 for convenient transport when not in use.

The vertical bar 12 has a length defined between the upper and lower ends 13,14 of the vertical bar 12. Each of the arm portions 16,17 has a length defined from the midpoint of the horizontal bar 15 to the adjacent end of the horizontal bar 15. The cross bar 24 has a length defined between the ends of the cross bar 24. Each of the extension bars 25,26 has a length defined between the horizontal bar 15 and the cross bar 24. In an ideal illustrative embodiment, the length of the vertical bar 12 is about 12 inches, the length of each of the arm portions 16,17 is about 8 inches, the length of the cross bar 24 is about 12 inches, and the length of each of the extension bars 25,26 is about 3 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ladder attachment, comprising:

a vertical bar having a free tipper end, a lower end and a longitudinal axis extending between said tipper and lower ends of said vertical bar;

a V-shaped horizontal bar having a pair of arm portions and a vertex interposed between said arm portions at a midpoint of said horizontal bar, said arm portions of said horizontal bar defining a generally V-shaped space adapted for receiving a tree trunk abutting said arm portions, said vertex of said horizontal bar being coupled to said lower end of said vertical bar so that said horizontal bar is adapted to align said vertical bar vertically with the tree trunk when said horizontally bar is abutted against the tree trunk and said vertical bar is adapted to lie in a common vertical plane with a center vertical axis of the tree trunk, said horizontal bar having a pair of opposite ends, said midpoint located equidistantly between said ends of said horizontal bar;

an elongate flexible member having a pair of opposite ends coupled to said upper end of said vertical bar;

said flexible member forming a loop adapted for wrapping around a tree trunk to hold the vertical bar to the tree trunk;

a cross bar having a pair of opposite ends and a longitudinal axis extending between said ends of said cross bar;

a spaced apart pair of extension bars connecting said cross bar and said horizontal bar together;

a ladder comprising a spaced apart pair of elongate flexible rails and a plurality of spaced apart rungs; and each of said flexible rails having a top end coupled to said cross bar such that said ladder depends from said cross bar;

wherein each of said extension bars comprises a pair of detachable portions, a first of said detachable portions of each of said extension bars being coupled to said horizontal bar, a second of said detachable portions of each of said extension bars being coupled to said cross bar;

said second detachable portion of each extension bar receiving therein said first detachable portion of the respective extension bar to couple said first and second detachable portions together; and said extension bar, said horizontal bar and said cross bar generally lying in a common horizontal plane when said ladder attachment is mounted to a tree trunk.

2. The ladder attachment of claim 1, wherein said vertical bar, said horizontal bar, and said cross bar are tubular.

3. The ladder attachment of claim 2, wherein said vertical bar, said horizontal bar, and said cross bar each have a generally rectangular transverse cross section.

4. The ladder attachment of claim 1, wherein said arm portions are extended at an obtuse angle from one another.

5. The ladder attachment of claim 1, wherein said vertical bar and said horizontal bar each have a back face adapted for contacting the tree trunk said vertical bar and said horizontal bar abut against, said back faces of said vertical bar and said horizontal bar each having a plurality of cleat ridges for frictionally enhancing the contact between the back faces and the tree trunk to help hold said vertical bar and said arm portions are adapted to be in a fixed position with respect to the tree trunk.

6. The ladder attachment of claim 1, wherein one of said ends of said flexible member is detachably attached to said upper end of said vertical bar.

7. A ladder attachment for climbing a trunk of a tree, comprising:

an elongate vertical bar having a free upper end, and a lower end and a longitudinal axis extending between said upper and lower ends of said vertical bar;

wherein said vertical bar is tubular and has openings therein at said upper and lower ends of said vertical bar;

said vertical bar having a generally rectangular transverse cross section generally perpendicular to said longitudinal axis of said vertical bar;

a horizontal bar being coupled to said lower end of said vertical bar, said horizontal bar having a pair of opposite ends and a midpoint located between said ends of said horizontal bar;

said midpoint of said horizontal bar being about equidistant from each of said ends of said horizontal bar;

said lower end of said vertical bar being positioned at said midpoint of said horizontal bar;

wherein said horizontal bar is tubular and has openings therein at said ends of said horizontal bar:

said midpoint of said horizontal bar dividing said horizontal bar into a pair of arm portions, each of said arm portions of said horizontal bar having a longitudinal axis extending between said midpoint of said horizontal bar and an adjacent end of said-horizontal bar;

each of said arm portions of said horizontal bar having a generally rectangular transverse cross section generally perpendicular to said longitudinal axis of the respective arm portion;

said longitudinal axes of said arm portions generally lying in a common plane, said longitudinal axis of said vertical bar being extended generally perpendicular to said common plane of said longitudinal axes of said arm portions;

said vertical bar and said arm portions of said horizontal bar being adapted for abutting against a tree trunk such that said longitudinal axis of said vertical bar is extended generally vertically and said longitudinal axes of said arm portions are extended generally horizontally and such that said horizontal bar is adapted to align said vertical bar in a common vertical plane with a center vertical axis of the tree trunk;

said longitudinal axes of said arm portions being extended at an obtuse angle from one another to define a generally V-shaped spaced adapted for receiving a tree trunk abutting said arm portions, said arm portions forming a vertex at said midpoint of said horizontal bar adapted for extending outwardly away from the tree trunk said arm portions rest against;

said vertical bar and said arm portions of said horizontal bar each having a back face adapted for contacting the tree trunk said vertical bar and said arm portions abut against, said back faces of said vertical bar and said arm portions each having a plurality of cleat ridges for frictionally enhancing the contact between the back faces and the tree trunk to help hold said vertical bar and said arm portions are adapted to be in a fixed position with respect to the tree trunk;

an elongate flexible member having a pair of opposite ends, wherein said flexible member comprises a length of chain, a first of said ends of said being coupled to said upper end of said vertical member, a second of said ends of said flexible member being detachably attached to said upper end of said vertical bar;

said flexible member forming a loop adapted for wrapping around a tree trunk to hold the vertical bar to the tree trunk;

wherein said upper end of said vertical bar has a spring clip pivotally coupled thereto, said spring clip detachably attaching said second end of said flexible member to said upper end of said vertical member;

a cross bar having a pair of opposite ends and a longitudinal axis extending between said ends of said cross bar, said wherein cross bar is tubular and has openings therein at said ends of said cross bar;

said cross bar being spaced apart from said vertex of said horizontal bar;

a spaced apart pair of extension bars connecting said cross bar and said horizontal bar together, one of said extension bars being outwardly extended from one of said arm portions of said horizontal bar, another of said extension bars being outwardly extending from another of said arm portions of said horizontal bar;

said extension bars being extended generally parallel to one another and generally perpendicular to said longitudinal axis of said cross bar, said extension bar, wherein said horizontal bar and said cross bar are adapted to generally lie in a common horizontal plane when said ladder attachment is mounted to a tree trunk;

a ladder comprising a spaced apart pair of elongate flexible rails and a plurality of spaced apart rungs extending between said flexible rails, wherein said flexible rails each comprise a flexible rope;

each of said flexible rails having a top end coupled to said cross bar such that said ladder depends from said cross bar, said top end of one of said flexible rails being positioned adjacent one of said ends of said cross bar, said top end of another of said flexible rails being positioned adjacent another of said ends of said cross bar;

wherein each of said extension bars comprises a pair of detachable portions, a first of said detachable portions of each of said extension bars being coupled to said horizontal bar, a second of said detachable portions of each of said extension bars being coupled to said cross bar; and said second detachable portion of each extension bar receiving therein said first detachable portion of the respective extension bar to couple said first and second detachable portions together.

* * * * *